(12) United States Patent
Wang et al.

(10) Patent No.: US 9,913,122 B2
(45) Date of Patent: Mar. 6, 2018

(54) SDN EPC NETWORK-BASED CHARGING METHOD, SYSTEM AND STORAGE MEDIUM

(71) Applicant: ZTE Corporation, Shenzhen, Guangdong (CN)

(72) Inventors: Jing Wang, Shenzhen (CN); Na Zhou, Shenzhen (CN); Yifeng Bi, Shenzhen (CN); Jun Wang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 64 days.

(21) Appl. No.: 14/905,139

(22) PCT Filed: May 20, 2014

(86) PCT No.: PCT/CN2014/077925
§ 371 (c)(1),
(2) Date: Jan. 14, 2016

(87) PCT Pub. No.: WO2014/169877
PCT Pub. Date: Oct. 23, 2014

(65) Prior Publication Data
US 2016/0174055 A1    Jun. 16, 2016

(30) Foreign Application Priority Data

Aug. 12, 2013    (CN) .......................... 2013 1 0350249

(51) Int. Cl.
*H04L 1/00*    (2006.01)
*H04W 4/24*    (2018.01)
(Continued)

(52) U.S. Cl.
CPC ........... *H04W 4/24* (2013.01); *H04L 12/1407* (2013.01); *H04L 12/1435* (2013.01); *H04L 12/1439* (2013.01); *H04M 15/66* (2013.01)

(58) Field of Classification Search
CPC ......... H04L 43/00; H04L 43/50; H04L 47/70; H04L 47/72; H04L 47/74; H04L 47/78;
(Continued)

(56) References Cited

U.S. PATENT DOCUMENTS

2007/0100978 A1    5/2007  Levi
2007/0208803 A1    9/2007  Levi
(Continued)

FOREIGN PATENT DOCUMENTS

CN    101197687 A    6/2008
CN    101409954 A    4/2009
(Continued)

OTHER PUBLICATIONS

International Search Report in international application No. PCT/CN2014/077925, dated Aug. 6, 2014, 2 pgs.
(Continued)

*Primary Examiner* — Dady Chery
(74) *Attorney, Agent, or Firm* — Cooper Legal Group, LLC

(57) ABSTRACT

Disclosed is a charging method and system based on a SDN EPC network, which includes: receiving, by a controller, a charging rule from a charging rule generator, and establishing, through binding, a correspondence between a flow table of the controller and the charging rule; setting, by the controller, entries for the flow table bound to the charging rule, and sending the set flow table to a UGW; and receiving, by the controller, a statistical result, reported from the UGW, regarding traffic and/or duration consumed by a service in the flow table, and charging for the service according to the statistical result and the charging rule bound to the flow table.

20 Claims, 8 Drawing Sheets

(51) Int. Cl.
*H04L 12/14* (2006.01)
*H04M 15/00* (2006.01)

(58) Field of Classification Search
CPC ......... H04L 47/80; H04L 47/18; H04L 47/22; H04L 47/225; H04W 24/00; H04B 17/00; H04B 2203/5437; H04B 2203/5441; H04B 2203/544; H04J 3/14
USPC .......................................... 370/229, 230, 235
See application file for complete search history.

(56) References Cited

U.S. PATENT DOCUMENTS

| | | |
|---|---|---|
| 2012/0300615 A1 | 11/2012 | Kempf |
| 2012/0303835 A1 | 11/2012 | Kempf |
| 2013/0054761 A1 | 2/2013 | Kempf |
| 2013/0091281 A1 | 4/2013 | Chai et al. |
| 2013/0148498 A1* | 6/2013 | Kean ................. H04L 41/0893 370/230 |
| 2015/0043574 A1 | 2/2015 | Akiyoshi |
| 2015/0071053 A1 | 3/2015 | Kempf et al. |

FOREIGN PATENT DOCUMENTS

| | | |
|---|---|---|
| CN | 102264056 A | 11/2011 |
| WO | 2012160465 A1 | 11/2012 |
| WO | 2013042373 A1 | 3/2013 |

OTHER PUBLICATIONS

English Translation of the Written Opinion of the International Search Authority in international application No. PCT/CN2014/077925, dated Aug. 6, 2014, 9 pgs.
Supplementary European Search Report in European application No. 14785652.0, dated Jun. 29, 2016, 10 pgs.
J-J P Balbas et al: "Policy and charging control in the evolved packet system", IEEE Communications Magazine, IEEE Service Center, Piscataway, US, vol. 47, No. 2, Feb. 1 2009 (Feb. 1 2009), pp. 68-74, XP011280741,ISSN: 0163-6804, DOI:10.1109/MCOM.2009.4785382, dated Feb. 1, 2009, 7 pgs.
"3rd Generation Partnership Project;Technical Specification Group Services and System Aspects;Telecommunication management;Charging management;Packet Switched (PS) domain charging", 3GPP TS 32.251, V14.3.0, Jun. 2017, 186 pgs.

* cited by examiner

US 9,913,122 B2

SDN EPC NETWORK-BASED CHARGING METHOD, SYSTEM AND STORAGE MEDIUM

TECHNICAL FIELD

The present disclosure relates to charging technology for communication, specifically to a method and system for charging based on a Software Defined Network (SDN) and Evolved Packet Core (EPC) network.

BACKGROUND

Operators always confront a problem about how to safely and effectively charge for user's communications. In prior art, when an EPC network charges for user's communication, a PDN Gateway (PGW) and a Serving Gateway (SGW), as forwarding plane devices in the EPC network, are both integrated with a Charging Trigger Function (CTF), a Charging Data Function (CDF) and a Charging Gateway Function (CGF), with which the collection and the credit control of charging information may be achieved, further implementing offline charging or online charging to the user reliably.

In conclusion, the PGW and SGW in the EPC network have not only the essential function as forwarding plane devices, i.e., the forwarding function, but also a logic control function for controlling operations related to charging. The forwarding plane devices in the EPC network therefore have too much load and heavy burden. Furthermore, although the introduction of multiple new technologies such as offloading technology in the EPC network may lead to more overall network functions, the EPC network in which the new technologies are introduced requires test and deployment prior to the introduction which have a long cycle and high cost.

The Open Flow protocol of the network switching model implements the separation between control and forwarding by dividing the network entities into control plane devices and forwarding plane devices. In this case, the control plane devices are used for issuing logic control to forwarding plane devices to instruct the actions of the forwarding plane devices; the forwarding plane devices forward a traffic flow to a certain physical port or logical unit according to the instruction recorded in a flow table issued by the control plane devices. SDN, which is the evolution of the Open Flow protocol, not only has the advantages inherited from the Open Flow protocol, but also implements complex network applications by using software programming technology on the control plane devices, in which situation forwarding plane devices only need to perform the logical control issued from control plane devices without need of any adaptive change. Meanwhile, since the control plane devices of the SDN may be implemented in the form of a combination of a universal server and a universal operating system, or in the form of a universal software programming tool or of a script language such as Python which is easy to transplant and to understand, the support to new technologies of the SDN network becomes quite easy, i.e. the SDN network is more universal and compatible, enabling the deployment cycle for introducing new technologies to be reduced significantly.

There is an eager requirement for a SDN EPC network-based charging method, combining respective features of a SDN network and an EPC network and considering the diversity and versatility of future networks.

SUMMARY

In order to solve the existing technical problems, the embodiments of the present disclosure provide a method, system and storage media for charging based on a SDN EPC network, which are adapted to the separation between control and forwarding of a new generation mobile communication network, with better universality and portability.

The technical scheme of the embodiments of the present disclosure is implemented as follows:

An embodiment of the present disclosure provides a charging method based on a software defined network evolved packet core (SDN EPC) network, which includes:

receiving, by a controller, a charging rule from a charging rule generator, and establishing, through binding, a correspondence between a flow table of the controller and the charging rule;

setting, by the controller, entries for the flow table bound to the charging rule, and sending the flow table to a unified gateway (UGW); and receiving, by the controller, from the UGW a statistical result regarding traffic and/or duration consumed by a service in the flow table, and charging for the service according to the statistical result and the charging rule bound to the flow table.

In the above technical scheme, the method may further include: after the controller sends the flow table to the UGW, statistically analysing, by the UGW, the traffic and/or duration consumed by service data according to the flow table and a charging mode associated with the flow table, and reporting the statistical result to the controller; wherein the charging rule comprises the charging mode.

In the above technical scheme, the charging mode may include: charging on traffic and/or charging on duration.

In the above technical scheme, for the charging mode which is charging on traffic, the flow table sent from the controller to the UGW is set with a payload counter entry and an operation instruction entry for instructing the UGW to count data packet payloads;

the UGW counts the data packet payloads using a payload counter;

when user state information and/or current statistical charging information are/is detected by the controller to meet a set triggering condition, the controller sends a message for requesting the UGW to report the statistical result to the UGW, the UGW receives the message and reports the amount of the counted data packet payloads to the controller; and the controller calculates traffic usage of the service data based on the statistical result.

In the above technical scheme, for the charging mode which is charging on traffic, the flow table sent from the controller to the UGW is set with an operation instruction entry for instructing the UGW to initiate a counter of the UGW for counting service data packets;

the UGW counts data packets in a service flow using the counter of the UGW;

when user state information and/or current statistical charging information are/is detected by the controller to meet a set triggering condition, the controller sends a message for requesting the UGW to report the statistical result to the UGW, the UGW receives the message and reports the amount of the counted data packets to the controller;

the controller calculates traffic usage of the service data based on the statistical result.

In the above technical scheme, for the charging mode which is charging on traffic, the flow table sent from the controller to the UGW is set with a timer entry or a traffic threshold entry, and with an operation instruction entry for instructing the UGW to initiate a payload counter which is set in the flow table to count data packet payloads, or instructing the UGW to initiate a counter of the UGW to count data packets;

the UGW initiates the timer, and initiates the payload counter to count data packet payloads, or initiates the counter of the UGW to count data packets;

the UGW reports the amount of the counted data packet payloads or the amount of the counted data packets to the controller upon detection of an expiration of the timer or reaching of the traffic threshold;

the controller calculates traffic usage of service data based on the statistical result reported from the UGW.

In the above technical scheme, for the charging mode which is charging on duration, the flow table sent from the controller to the UGW is set with a duration timer entry, a watchdog timer entry, and set with an operation instruction entry for instructing the UGW to take a time at which data packets arrive at the flow table as a start time at which a duration timer is initiated, and to initiate a watchdog timer upon complete reception of the data packets;

the UGW takes the time at which the data packets arrive at the flow table as the start time at which the duration timer is initiated, initiates the duration timer, and initiates the watchdog timer upon complete reception of the data packets; the duration timer terminates timing when the watchdog timer detects arrival of a time at which the duration timer terminates timing;

when the controller detects user state information and/or current statistical charging information meet a set triggering condition, the controller sends a message for requesting the UGW to report the statistical result, and the UGW receives the message and reports duration of transmission of the data packets, calculated by the duration timer, to the controller;

the controller calculates duration of use of service data based on the statistical result reported from the UGW.

In the above technical scheme, for the charging mode which is charging on duration, the flow table sent from the controller to the UGW is set with a timer entry, a duration timer entry and a watchdog timer entry, and set with an operation instruction entry for instructing the UGW to take a time at which data packets arrive at the flow table as a start time at which a duration timer is initiated, and to initiate a watchdog timer upon complete reception of the data packets;

the UGW takes the time at which the data packets arrive at the flow table as the start time at which the duration timer is initiated, and initiates the watchdog timer upon complete reception of the data packets; the watchdog timer triggers the duration timer to terminate timing when the watchdog timer detects arrival of a time at which the duration timer terminates timing; the UGW monitors the timer, and reports duration of transmission of the data packets, calculated by the duration timer, to the controller when the timer expires;

the controller calculates duration of use of service data based on the statistical result reported from the UGW.

In the above technical scheme, for the charging mode which is charging on duration, the flow table sent from the controller to the UGW is set with a watchdog timer entry, and set with an operation instruction entry for instructing the UGW to report a start time at which transmission of the data packets starts, and to report a termination time at which the transmission of the data packets is terminated;

the UGW takes the time at which the data packets arrive at the flow table as the start time of the transmission, and initiates the watchdog timer upon complete reception of the data packets; the watchdog timer detects an arrival of the termination time at which the transmission of the data packets is terminated, and reports the start time and the termination time of the transmission of the data packets to the controller; the controller calculates duration of use of service data based on the statistical result reported from the UGW.

In the above technical scheme, the user state information may include at least one of the following: a user location, an access network type, a used rate period, and quality of service;

the statistical charging information comprises at least one of the following: user's credit quota, traffic, the amount of data packets, the amount of data packet payloads, duration of transmission of data packets, start time of the transmission of data packets, and termination time of the transmission of data packets.

In the above technical scheme, the method may further include:

the duration timer continues timing in a situation that there is still data transmission in the flow table before expiration of timing time of the watchdog timer; the duration timer takes the time at which the timing time expires as the time at which the duration timer terminates timing in a situation that there is no data transmission after the expiration of the timing time of the watchdog timer; or the watchdog timer continues monitoring the arrival of the termination time at which the transmission of data packets is terminated in a situation that there is still data transmission in the flow table before expiration of timing time of the watchdog timer; the watchdog timer takes the time at which the timing time expires as the termination time when the transmission of data packets is terminated in a situation that there is no data transmission after the expiration of the timing time of the watchdog timer.

An embodiment of the present disclosure also provides a charging system based on a software defined network evolved packet core (SDN EPC) network, comprising a charge rule generator, a controller and a unified gateway (UGW), wherein the charging rule generator is configured to generate a charging rule for a user service, and sending the charging rule to the controller;

the controller is configured to establish through binding a correspondence between a flow table of the controller and the charging rule according to the charging rule, set entries for the flow table bound to the charging rule, and send the flow table to the UGW;

the UGW is configured to statistically analyse traffic and/or duration consumed by service data according to the flow table and a charging mode associated with the flow table, and report a statistical result to the controller; and the controller is configured to charge for the service according to the statistical result and the charging rule bound to the flow table;

wherein the charging rule comprises the charging mode.

In the above technical scheme, the charging mode may include: charging on traffic and/or charging on duration.

In the above technical scheme, when the charging mode is the charging on traffic, the controller is configured to set a payload counter entry for the flow table, set an operation instruction entry for instructing the UGW to count data packet payloads, and send the flow table to the UGW;

the UGW is correspondingly configured to receive the flow table and use a payload counter to count the data packet payloads;

the controller is configured to send a message for requesting the UGW to report the statistical result to the UGW when user state information and/or current statistical charging information are/is detected to meet a set triggering condition;

the UGW is configured to report the amount of the counted data packet payloads to the controller upon reception of said message; and the controller is configured to calculate traffic usage of the service data based on the statistical result.

In the above technical scheme, when the charging mode is the charging on traffic, the controller is configured to set an operation instruction entry for the flow table for instructing the UGW to initiate a counter of the UGW for counting service data packets, and send the flow table to the UGW;

the UGW is correspondingly configured to receive the flow table and count data packets in a service flow using the counter of the UGW; the controller is configured to send a message for requesting the UGW to report the statistical result when user state information and/or current statistical charging information are/is detected to meet a set triggering condition;

the UGW is configured to report the amount of the counted data packets to the controller upon reception of said message; and the controller is configured to calculate traffic usage of the service data based on the statistical result.

In the above technical scheme, when the charging mode is the charging on traffic, the controller is configured to set a timer entry or a traffic threshold entry for the flow table, and set an operation instruction entry for instructing the UGW to initiate a payload counter which is set in the flow table to count data packet payloads, or instructing the UGW to initiate a counter of the UGW to count data packets; and send the flow table to the UGW;

the UGW is correspondingly configured to receive the flow table, initiate the timer, and initiating the payload counter to count data packet payloads, or initiating the counter of the UGW to count data packets; report the amount of the counted data packet payloads or the amount of the counted data packets to the controller upon detection of an expiration of the timer or reaching of the traffic threshold; and the controller is configured to calculate traffic usage of service data based on the statistical result reported from the UGW.

In the above technical scheme, when the charging mode is the charging on duration, the controller is configured to set a duration timer entry and a watchdog timer entry for the flow table, and set an operation instruction entry for instructing the UGW to take a time at which data packets arrive at the flow table as a start time at which a duration timer is initiated, and to initiate a watchdog timer upon complete reception of the data packets, and to send the flow table to the UGW;

the UGW is configured to receive the flow table, take the time at which the data packets arrive at the flow table as the start time at which the duration timer is initiated, initiate the duration timer, and initiate the watchdog timer upon complete reception of the data packets; wherein the duration timer terminates timing when the watchdog timer detects the arrival of a time at which the duration timer terminates timing;

the controller is configured to send a message for requesting the UGW to report the statistical result when user state information and/or current statistical charging information are/is detected to meet a set triggering condition;

the UGW is configured to report duration of transmission of the data packets, which is calculated by the duration timer, to the controller upon reception of said message; and the controller is configured to calculate duration of use of service data based on the statistical result reported from the UGW.

In the above technical scheme, when the charging mode is the charging on duration, the controller is configured to set a timer entry, a duration timer entry and a watchdog timer entry for the flow table, and set an operation instruction entry for instructing the UGW to take a time at which data packets arrive at the flow table as a start time at which a duration timer is initiated, and to initiate a watchdog timer upon complete reception of the data packets; and send the flow table to the UGW;

the UGW is correspondingly configured to receive the flow table, take the time at which the data packets arrive at the flow table as the start time at which the duration timer is initiated, and initiate the watchdog timer upon complete reception of the data packets; the watchdog timer is configured to trigger the duration timer to terminate timing when the watchdog timer detects arrival of a time at which the duration timer terminates timing; the UGW is configured to monitor the timer and report duration of transmission of the data packets, calculated by the duration timer, to the controller when the timer expires; and the controller is configured to calculate duration of use of service data based on the statistical result reported from the UGW.

In the above technical scheme, when the charging mode is the charging on duration, the controller is configured to set an watchdog timer entry for the flow table, and setting an operation instruction entry for instructing the UGW to report a start time at which transmission of the data packets starts, and to report a termination time at which the transmission of the data packets is terminated, and to send the flow table to the UGW;

the UGW is correspondingly configured to receive the flow table, take the time at which the data packets arrive at the flow table as the start time of the transmission, and initiate the watchdog timer upon complete reception of the data packets; the watchdog timer detects an arrival of the termination time at which the transmission of the data packets is terminated, and report the start time and the termination time of the transmission of the data packets to the controller; and the controller is configured to calculate duration of use of service data based on the statistical result reported from the UGW.

In the above technical scheme, the user state information may include at least one of the following: a user location, an access network type, a used rate period, and quality of service;

the statistical charging information comprises at least one of the following: user's credit quota, traffic, the amount of data packets, the amount of data packet payloads, duration of transmission of data packets, start time of the transmission of data packets and termination time of the transmission of data packets.

In the above technical scheme, the watchdog timer may be further configured to:

when there is still data transmission in the flow table before expiration of timing time of the watchdog timer, notify the duration timer to continue timing; when there is no data transmission after the expiration of the timing time, notify the duration timer to take the time at which the timing time expires as the time at which the duration timer terminates timing; or when there is still data transmission in the flow table before expiration of timing time of the watchdog timer, continue monitoring the arrival of the termination time at which the transmission of data packets is terminated; when there is no data transmission after the expiration of the timing time of the watchdog timer, take the time at which the timing time expires as the termination time where the transmission of data packets is terminated.

An embodiment of the present disclosure also provides a computer storage media, in which computer-executable instructions are stored for implementing the charging method based on a SDN EPC network as described above.

The present disclosure provides a charging method and a charging system based on a SDN EPC network and a computer storage media, in which a controller receives a charging rule from a charging rule generator, and establishes, through binding, a correspondence between a flow table of the controller and the charging rule; the controller sets entries for the flow table bound to the charging rule, and sends the flow table to a UGW; the UGW statistically analyses the traffic or duration consumed by service data according to the received flow table and its charging mode, and reports a statistical result to the controller; and the controller receives from the UGW the statistical result regarding traffic or duration consumed by a service in the flow table, and charges for the service according to the statistical result and the charging rule bound to the flow table. The technical scheme according to the embodiments of the present disclosure enables the charging for communication services either in a SDN network or in an EPC network with good universality and enhanced portability, adapted to the development requirements of the new generation mobile communication.

DETAILED DESCRIPTION

Figure 1:
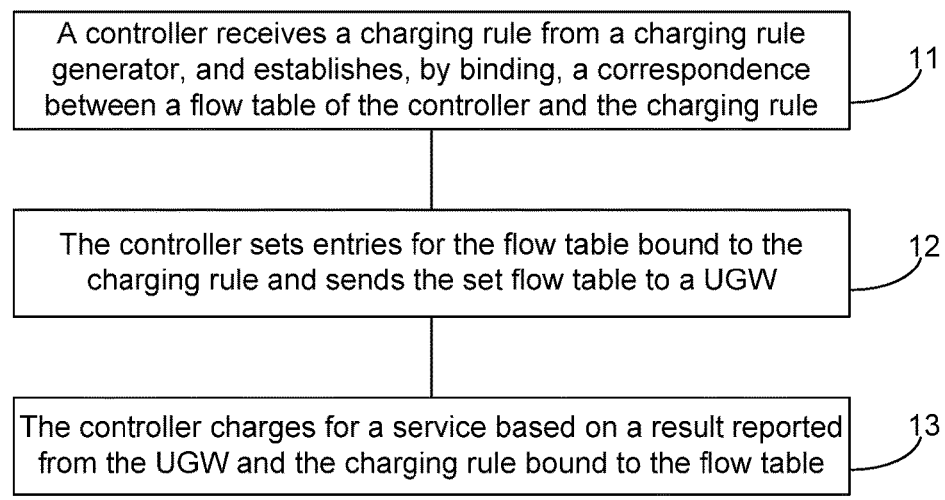
FIG. 1 shows a flow diagram of a charging method based on SDN EPC network according to an embodiment of the present disclosure.

As shown in FIG. 1, an embodiment of the present disclosure describes a charging method based on a SDN EPC network, which includes:

Step 11 is that: a controller receives a charging rule from a charging rule generator, and establishes, through binding, a correspondence between a flow table of the controller and the charging rule.

Here, the charging rule generator sends the charging rule to the controller upon reception of a request message for the charging rule from the controller.

Step 12 is that: the controller sets entries for the flow table bound to the charging rule, and sends the flow table to a unified gateway (UGW).

Here, charging for a service is performed according to the requirement of statistically analysing the traffic flow of the user service, e.g. according to the calculation of traffic or duration of the data packets in the traffic flow; entries such as payload counter, a timer, a traffic threshold, a duration timer, a watchdog timer, as well as an entry for operation instruction directed to the UGW, are set for the flow table bound with the correspondence. The operation instruction directed to the UGW is set according to actual statistical requirements. The entries set for the flow table and the contents of the operation instruction will be described with reference to the technical schemes below.

Here, the UGW statistically analyses the traffic and/or duration consumed by service data according to the received flow table and its charging mode, and reports a statistical result to the controller; wherein the charging rule includes: charging level, charging mode, etc.

Step 13 is that: the controller charges for the service according to the statistical result and the charging rule bound to the flow table.

The discrimination between an online charging system (OCS) and an offline charging system (OFCS) exists, and the charging method described in the embodiments of the present disclosure is suitable for both of them.

It should be noted that, the communication entities in the description of the charging method according to the embodiments of the present disclosure includes a mobile management entity (MME) in addition to a controller, a UGW, an OCS and an OFCS.

In this case, the charging rule generator may specifically be a policy and charging rules function (PCRF).

Figure 2A:
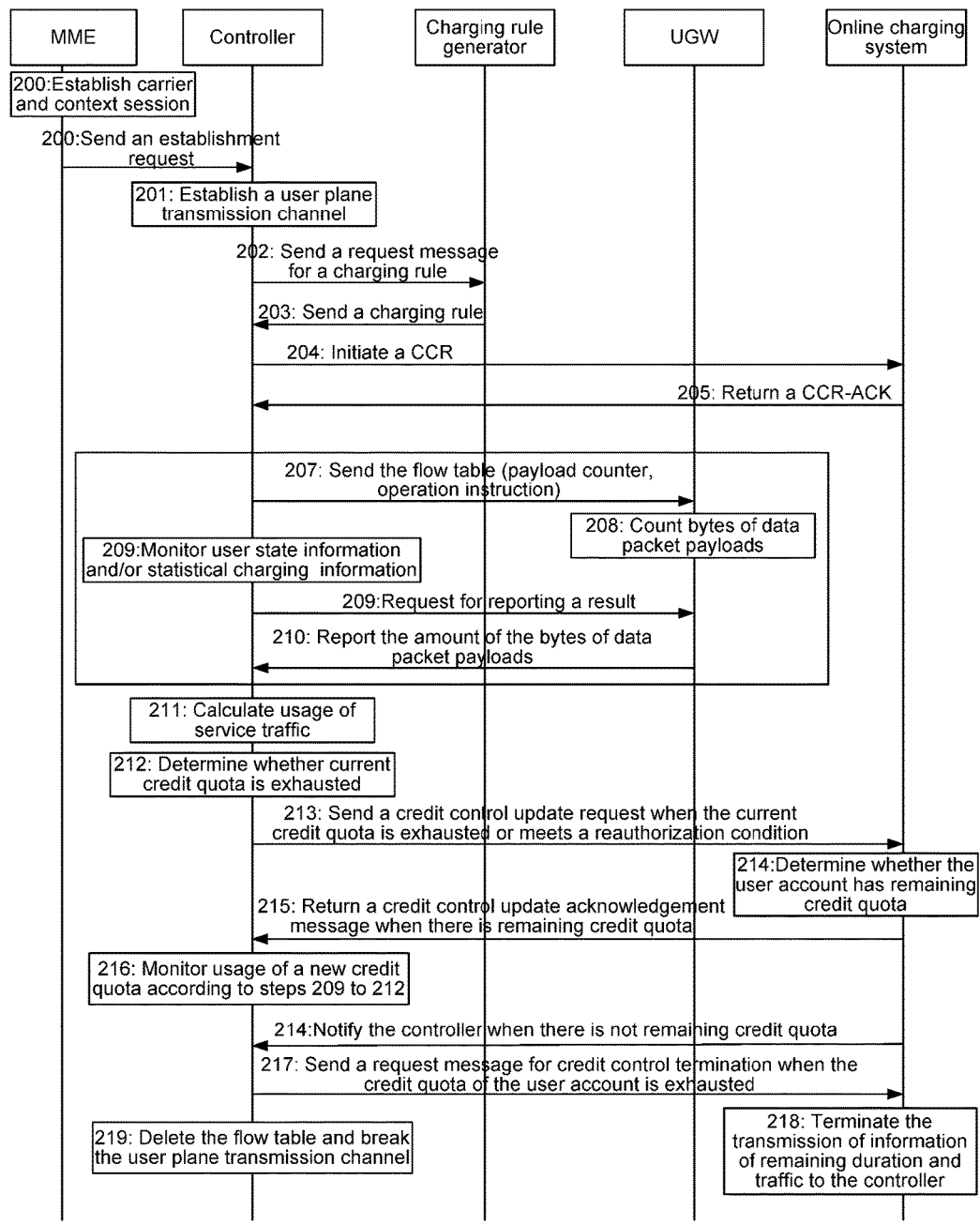
FIGS. 2(a) to 2(b) show a diagram of a specific embodiment of the charging method based on SDN EPC network according to the present disclosure.
Figure 2B:
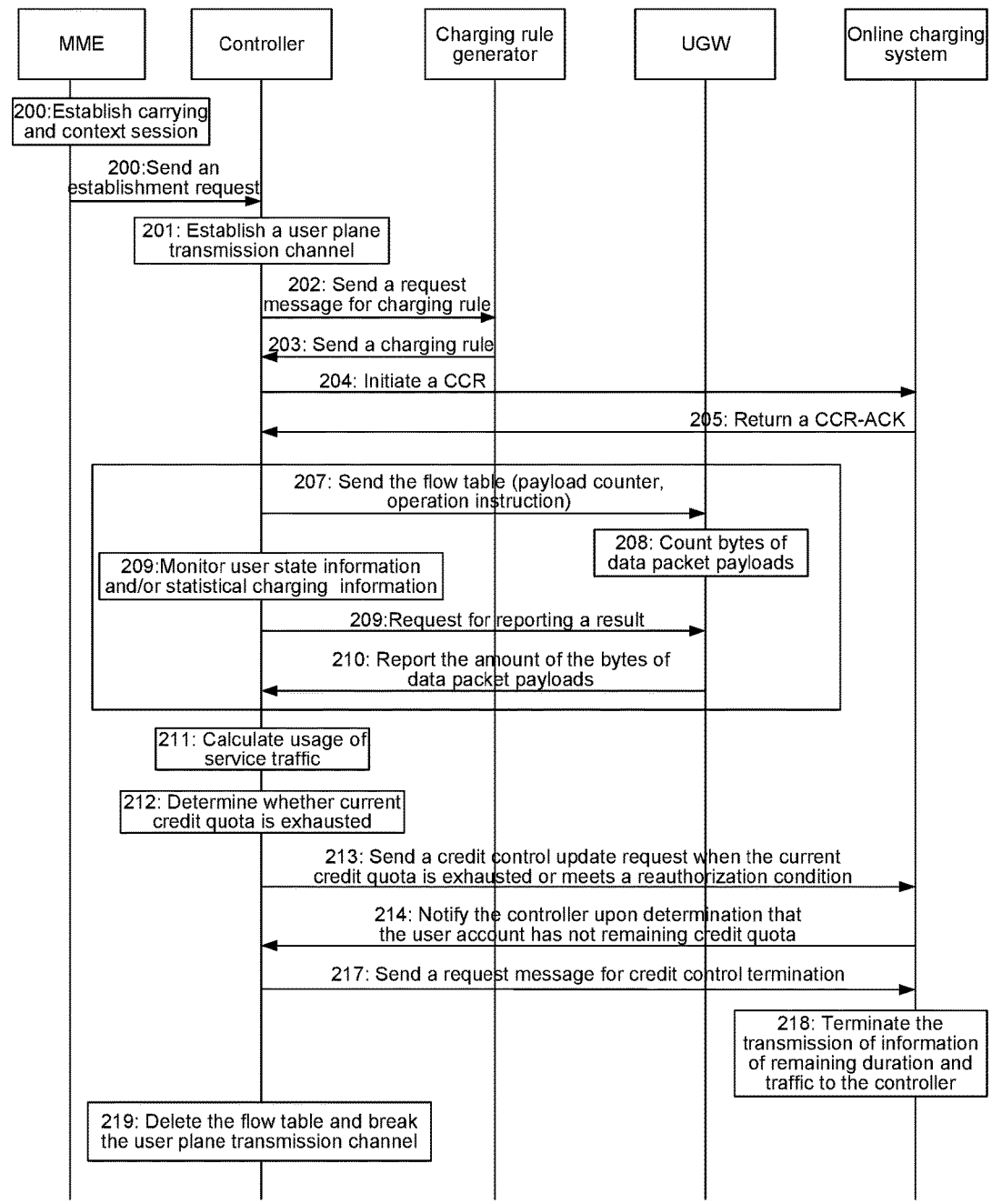

FIGS. 2(a) to 2(b) show a diagram of a specific embodiment of the charging method based on SDN EPC network according to the present disclosure. The technical scheme of this embodiment of the present disclosure will be further described in combination with FIGS. 2(a) to 2(b). The communication entities to which this embodiment refers include: a controller, a UGW, an OCS and an MME.

Step 200 is that: the MME establishes a service bearer and a context session, and sends a request message for establishing a user plane transmission channel to a controller.

In this case, the request message further carries charging features and user access information of users.

The charging features include: charging based on duration, charging on traffic, charging on duration and traffic, a rate period, access gateway information, etc. The user access information includes: the type of a network to access, the location of a user.

Step 201 is that: the controller establishes a user plane transmission channel upon reception of the request message, to provide a channel for the transmission of user service data.

Step 202 is that: the controller sends a request message for a charging rule to the charging rule generator.

Step 203 is that: the charging rule generator sends a charging rule to the controller upon reception of the request message for a charging rule.

In this case, the charging rule includes: charging levels and charging modes of the user. The charging levels include: ordinary charging for conversation, ordinary charging for Internet-surfing, preferential charging for conversation and preferential charging for Internet-surfing. The charging modes include: charging on duration, charging on traffic, charging on both duration and traffic.

Step 204 is that: the controller applies for a credit quota for a charging level in the charging rule upon reception of the charging rule, and initiates a credit control request (CCR) to the OCS.

Here, the charging modes include: charging based on duration, charging on traffic, charging on duration and traffic; the charging levels includes charging at different rates such as ordinary charging and preferential charging. Thus, the charging levels and the charging modes cooperate in practical applications, for example, for a user who has chosen ordinary charging and charging on traffic, the user applies to the OCS for a credit quota available to the user.

Step 205 is that: the OCS returns a credit control request acknowledgement (CCR-ACK) message to the controller upon reception of the CCR, the CCR-ACK carrying credit quotas of different charging levels.

Step 206 is that: the controller receives a credit quota corresponding to the charging level, generates a flow table according to a strategy rule in the policy and charging control (PCC) rule, and establishes, by binding, a correspondence between the flow table and the charging rule (e.g. a charging level and a corresponding credit quota).

Here, the flow table contains multiple entries which may be: an Internet protocol address of a user, a source address and a destination address of traffic flow, an operation instruction for a UGW, the amount of data packets in transmission, a charging mode, a charging level and a credit quota of a user and other statistical charging information.

It should be noted that following steps 207 to 210 describe a first preferred implementation of the charging method.

Step 207 is that: the controller sends the flow table to the UGW via an OFPT_FLOW_MOD message, the flow table is set with a payload counter entry and is set with an entry of an operation instruction directed to the UGW for instructing the UGW to count bytes of data packet payloads.

Step 208 is that: the UGW counts bytes of the data packet payloads using the payload counter.

Here, a data packet in the service flow generally contains a head. Hence, when the charging on traffic is chosen, the charging should be performed on the traffic of the payload bytes other than the heads in the data packets, and the traffic of the heads should not be charged. The UGW counts bytes of the data packet payloads using the payload counter according to the operation instruction in the flow table received from the controller.

Step 209 is that: the controller monitors whether user state information and/or current charging counting information meets a set triggering condition, and when the user state information and/or current charging counting information are/is detected to meet the triggering condition, the controller sends an OFPT_MULTIPART_Request message requesting the UGW to report a statistical result.

In this case, the change of the user state information includes, but is not limited to: change of quality of service (QoS), change of location of a user, change of the type of a user access network, change of a rate period.

The triggering condition includes, but is not limited to: exhaustion of credit quota, termination of service traffic flow, termination of carrying, expiration of duration. The triggering condition is set by an operator according to a practical communication situation and a user requirement.

The statistical charging information includes, but is not limited to: contents related to charging information such as user's credit quota, traffic, amount of data packets, amount of bytes of data packet payloads, duration of transmission of data packets, start time of the transmission of data packets, termination time of the transmission of data packets.

Here, since the OCS clears charges in real time, even if the user is in communication, the communication network will break automatically and does not provide services to the user in the case of exhaustion of the credit quota.

Here, there is no strict sequence between steps 208 and 209, which may be performed simultaneously.

Step 210 is that: the UGW reports the amount of bytes of the payloads counted by the payload counter to the controller via an OFPT_MULTIPART_Reply message upon reception of the OFPT_MULTIPART_Request message.

Step 211 is that: the controller may acquire traffic usage of the service and usage of the credit quota based on the statistical result reported from the UGW.

In this case, the controller receives the amount of bytes of the payloads counted by the payload counter and acquires the length of the payload in each data packet, therefore calculates the traffic of the bytes of the data packet payloads.

The usage of the credit quota includes: exhaustion of the credit quota, remaining of the credit quota.

Step 212 is that: when the controller acknowledges that current credit quota designated by the OCS is not exhausted, the controller returns to step 209; when the controller acknowledges that current credit quota designated by the OCS is exhausted or detects that the network currently meets the triggering condition of reauthorization, the controller goes to step 213.

In this case, the triggering condition of reauthorization includes, but is not limited to: change of QoS, change of location of a user, change of a rate period.

Step 213 is that: the controller sends a credit control update request to the OCS requesting the OCS to send a new credit quota, and then step 214 is executed.

Step 214 is that: the OCS receives the credit control update request, and when the OCS determines that there is credit quota remained in the user account, step 215 is executed; when the OCS determines that the credit quota of the user account is exhausted, the OCS notifies the controller to execute step 217.

Step 215 is that: the OCS returns a credit control update acknowledgement message which carries a new credit quota designated by the OCS, and step 216 is then executed.

Here, step 215 is a process for credit control update.

Step 216 is that: the controller monitors usage of the new credit quota in the way as described in steps 209 to 212 upon reception of the new credit quota.

Step 217 is that: the controller sends a request message for credit control termination to the OCS, and step 218 is then executed.

Step 218 is that: the OCS stops sending user information such as remaining credit quota, remaining traffic, remaining duration to the controller, and then step 219 is executed.

In this case, there is not strict sequence between steps 218 and 219, which may be performed simultaneously.

Step 219 is that: the controller searches for a flow table having no credit quota according to the correspondence between the credit quota and the flow table, deletes the flow table and breaks the user plane transmission channel.

In the above technical scheme, steps 217 to 219 describe a process for credit control termination. Concepts such as user access information, user state information, triggering condition, statistical charging information mentioned in following technical schemes of the embodiments of the present disclosure are the same as above and will not be described again.

In the above technical scheme, as the first preferred implementation of the charging method based on traffic, steps 207 to 210 relates to the encapsulation of data packets which have following forms: Generic Routing Encapsulation (GRE), General Packet Radio Service (GPRS), GPRS Tunnelling Protocol (GTP), Proxy Mobile IP (PMIP). The encapsulation of the data packets mentioned in following technical schemes is the same as above and will not be describe again.

Figure 3:
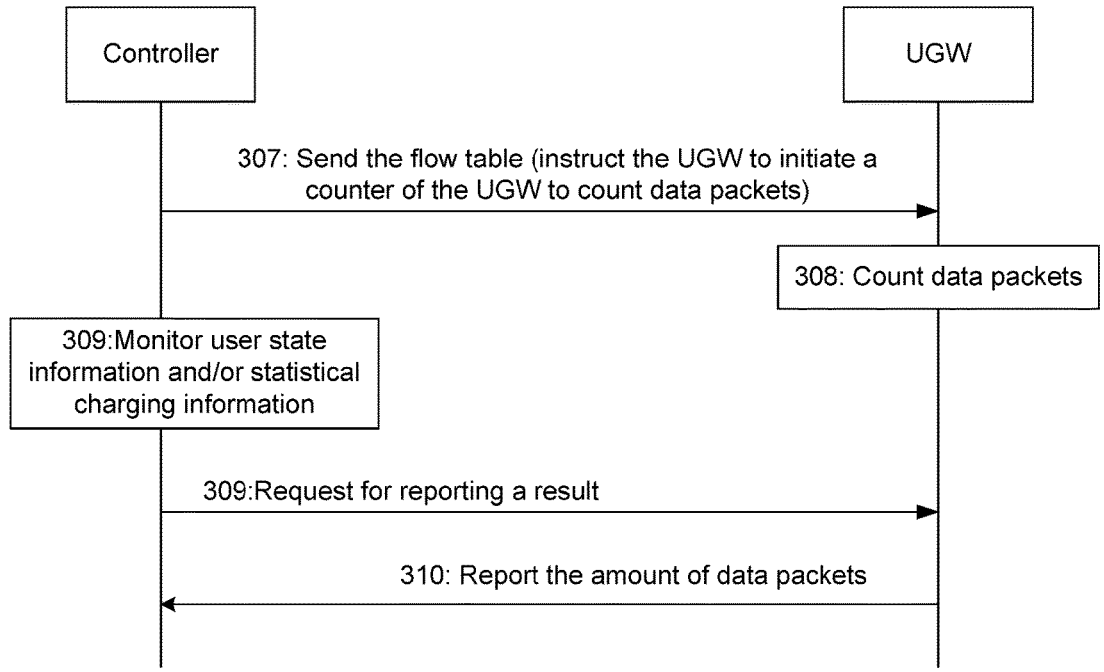
FIG. 3 shows a flow diagram of a preferred implementation of the charging method based on traffic according to an embodiment of the present disclosure.
Figure 4:
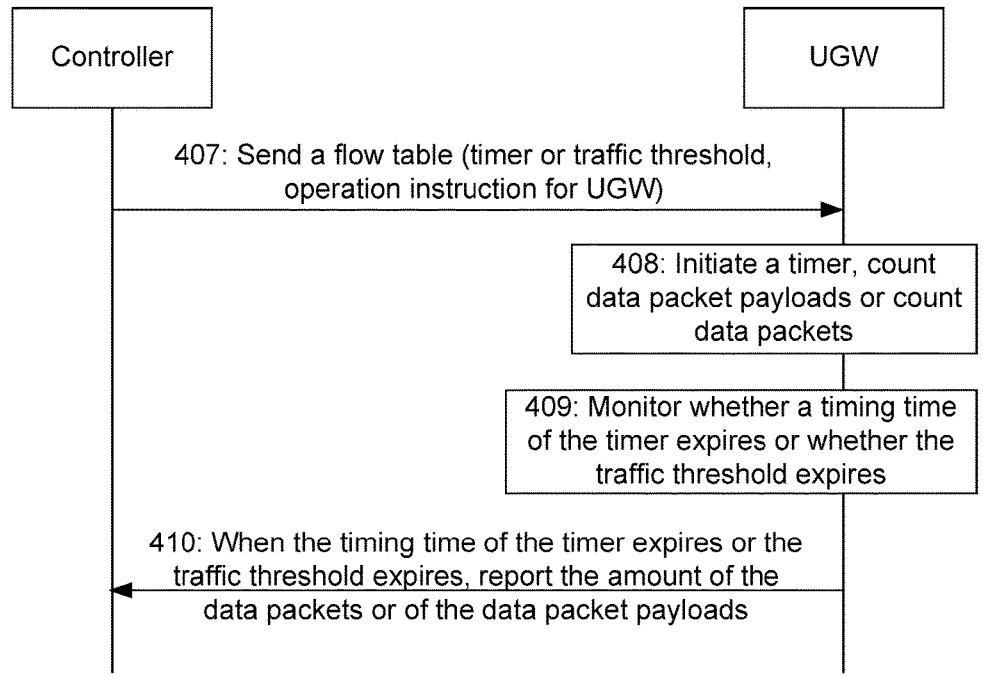
FIG. 4 shows a flow diagram of another preferred implementation of the charging method based on traffic according to an embodiment of the present disclosure.

In the above technical scheme, steps 207 to 210 describe the first preferred implementation of the charging method based on traffic. When the controller sends the flow table to the UGW, a payload counter entry and an entry for instructing the UGW to count bytes of data packet payloads are set in the flow table. Besides, there may be a second preferred implementation of the charging method based on traffic as shown in FIG. 3 and a third preferred implementation of the charging method on traffic as shown in FIG. 4.

The second preferred implementation of the charging method on traffic is further described with reference to FIG. 3.

Step 307 is that: the controller sends a flow table to the UGW via an OFPT_FLOW_MOD message, and sets an entry for operation instruction directed to the UGW for instructing the UGW to initiate a counter of the UGW for counting service data packets in the service flow.

Step 308 is that: the UGW uses a counter of the UGW to count the data packet payloads in a service flow.

Step 309 is that: the controller monitors whether user state information and/or current charging counting information meet(s) a set triggering condition, and when the user state information and/or current charging counting information are/is detected to meet the triggering condition, the controller sends an OFPT_MULTIPART_Request message requesting the UGW to report statistical result.

Here, there is not strict sequence between steps 308 and 309, which may be performed simultaneously.

Step 310 is that: the UGW reports the amount of the payloads counted by the counter of the UGW to the controller via an OFPT_MULTIPART_Reply message upon reception of the OFPT_MULTIPART_Request message.

Here, the second preferred implementation in FIG. 3 differs with the first preferred implementation in that, in the second preferred implementation, the UGW counts the data packets including a head. Furthermore, since the head of a data packet is designated by the controller, the controller may calculate overall traffic of the data packets based on the amount of the data packets received by the controller in consideration of the length of each data packet, then deduce the traffic of the bytes of data packet payloads by deducting the traffic of the head from the calculated overall traffic.

The third preferred implementation of the charging method based on traffic is further described with reference to FIG. 4.

Step 407 is that: the controller sends a flow table to the UGW via an OFPT_FLOW_MOD message, the flow table is set with a timer entry or a traffic threshold entry and is set with an entry for operation instruction directed to the UGW.

In this case, the operation instruction directed to the UGW may be: instructing the UGW to initiate the payload counter which is set in the flow table to count the bytes of data packet payloads, or instructing the UGW to initiate the counter of the UGW to count the data packets, which is determined by the granularity of charging required by the controller.

Step 408 is that: the UGW initiates the timer, and initiates the payload counter to count the bytes of data packet payloads, or initiates the counter of the UGW to count the data packets.

Step 409 is that: the UGW monitors whether a timing time of the timer arrives or the traffic threshold arrives, and step 410 is executed when timing time of the timer or the traffic threshold arrives; otherwise, step 409 is repeated.

Here, there is not strict sequence between steps 408 and 409, which may be performed simultaneously.

Step 410 is that: the UGW reports the amount of bytes of the counted payloads or the amount of the counted data packets to the controller via an OFPT_MULTIPART_Reply message.

Here, the controller may obtain traffic of the data packet payloads based on the received amount of bytes of payloads in consideration of the length of the data packets. When the controller receives the amount of the data packets, it may calculate overall traffic of the data packets in consideration of the length of the data packets, and then deduce the traffic of the data packet payloads by deducting the traffic of the head from the calculated overall traffic.

For the first, second and third preferred implementations of the charging method on traffic describe above, there are different charging modes including charging on traffic based on a carrier, charging on traffic based on a service flow and charging on traffic based on a user in the EPS network, therefore, in practical applications, for the charging on traffic based on a carrier, the controller may set the payload counter and instruct the UGW to count the bytes of payloads, or sets the UGW to initiate a timer of the UGW, or sets a timer or a traffic threshold and an operation instruction directed to the UGW in a flow table or its entry which matches with a user plane Tunnel Endpoint Identifier (TEID);

for the charging on traffic based on a service traffic flow, the controller may set the payload counter and instruct the UGW to count the payloads, or sets the UGW to initiate a timer of the UGW, or sets a timer or a traffic threshold and an operation instruction directed to the UGW in a flow table of its entry which matches with each service flow quintuple;

for the charging on traffic based on a user, the controller may set the payload counter and instruct the UGW to count the payloads, or sets the UGW to initiate a timer of the UGW, or sets a timer or a traffic threshold and an operation instruction directed to the UGW in a flow table of its entry which matches with the IP address of the user.

Amongst previous steps 200 to 219, steps 207 to 210 may be equivalently substituted by steps 307 to 310 in the second preferred implementation of the charging method on traffic, or by steps 407 to 410 in the third preferred implementation of the charging method on traffic. Accordingly, in step 212, when the controller acknowledges that the credit quota is not exhausted, it returns to step 309 or 409. In step 216, the controller monitors usage of a new credit quota in the way as described in steps 309, 310 to 212 or steps 409, 410 to 212 upon reception of the new credit quota.

Figure 5:
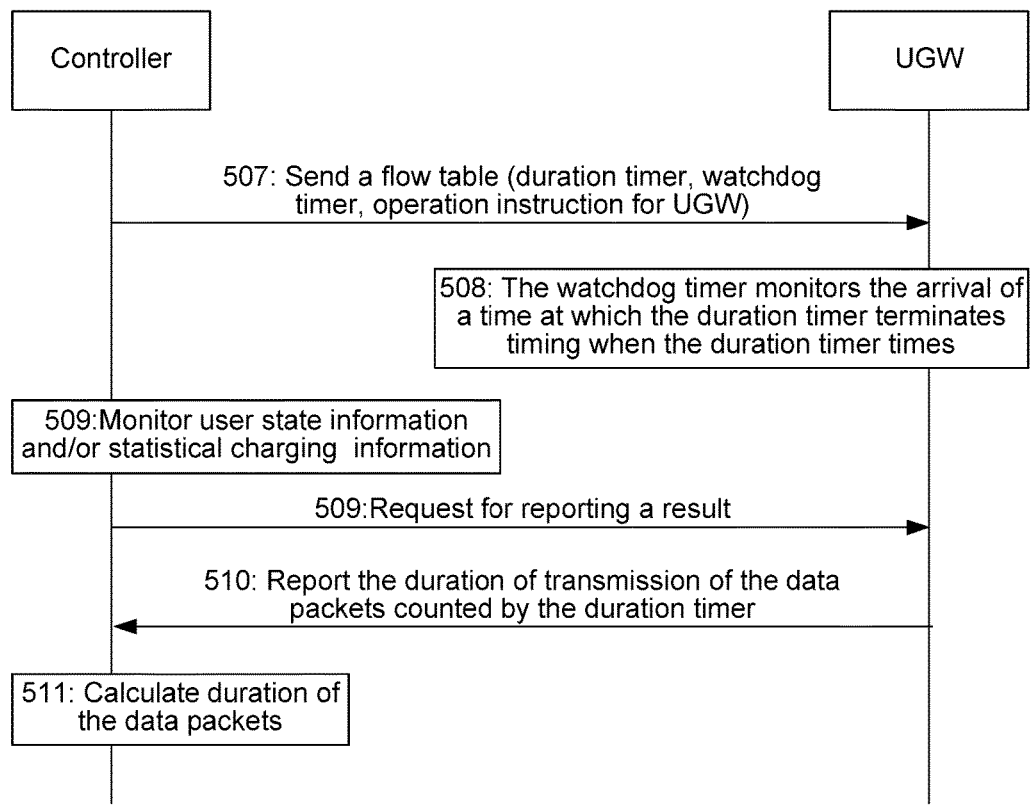
FIG. 5 shows a flow diagram of a first preferred implementation of the charging method based on duration according to an embodiment of the present disclosure.
Figure 6:
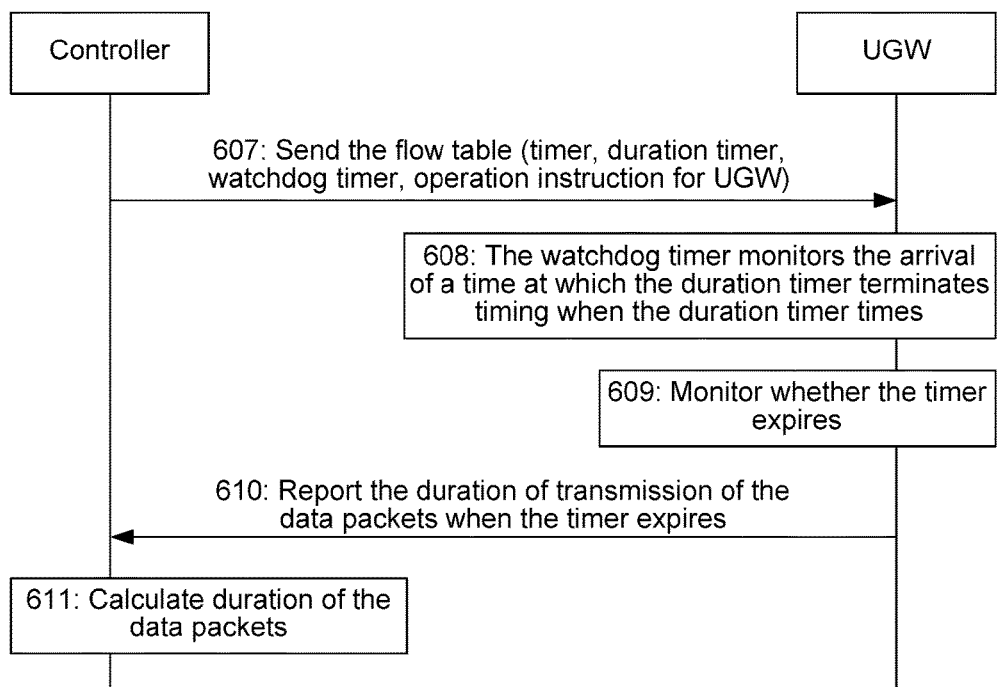
FIG. 6 shows a flow diagram of a second preferred implementation of the charging method on duration according to an embodiment of the present disclosure.
Figure 7:
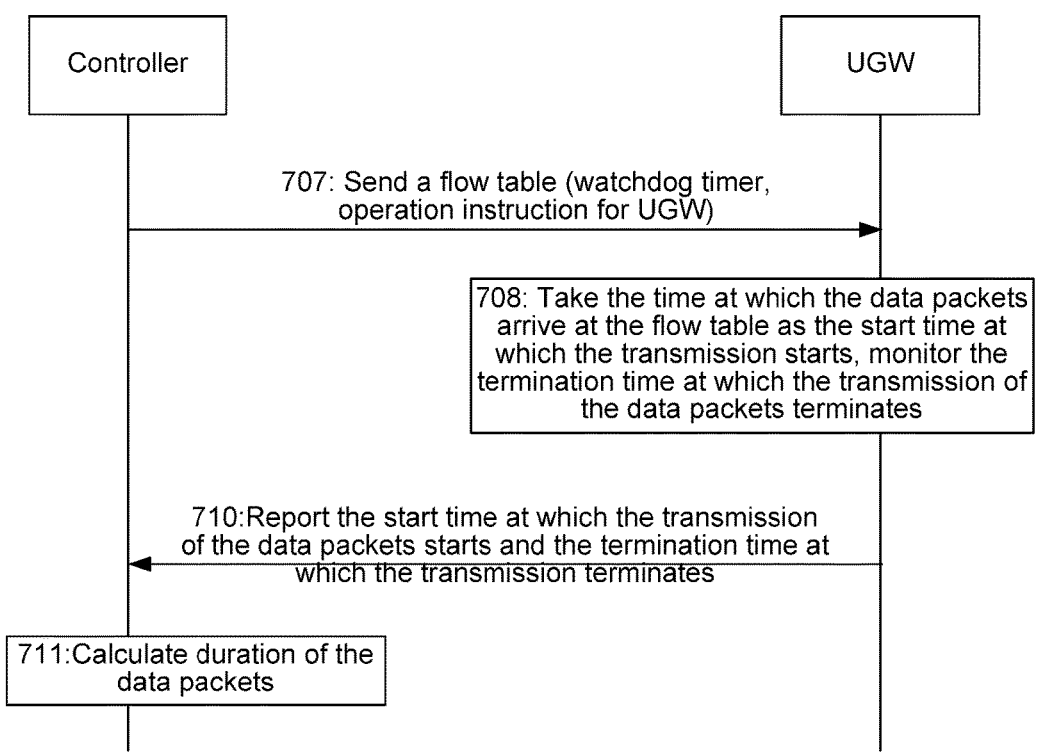
FIG. 7 shows a flow diagram of a third preferred implementation of the charging method on duration according to an embodiment of the present disclosure.

In the above description of the technical scheme, charging on traffic is taken as the example. The charging method involved in the embodiments of the present disclosure may be charging on duration in addition to charging on traffic. The embodiments of the present disclosure will be further described with reference to a first, second and third preferred implementations of the charging method on duration as shown in FIGS. 5, 6 and 7.

The first preferred implementation of the charging method based on duration is further described with reference to FIG. 5.

Step 507 is that: the controller sends a flow table to the UGW via an OFPT_FLOW_MOD message, sets a duration timer entry and a watchdog timer entry for the flow table, and sets an entry for operation instruction directed to the UGW for instructing the UGW to take a time at which the data packets arrive at the flow table as a start time at which the duration timer is initiated, and to initiate the watchdog timer upon complete reception of the data packets.

Step 508 is that: the UGW takes the time at which the data packets arrive at the flow table as the start time at which the timing starts, initiates the duration timer, and initiates the watchdog timer upon complete reception of the data packets; the watchdog timer monitors the arrival of a time at which the duration timer finishes timing.

Here, if there is data transmission in the flow table before expiration of timing time of the watchdog timer, then the duration timer continues timing; if there is no data transmission after the expiration of the timing time of the watchdog timer, then the time at which the timing time expires is taken as the time at which the timing is terminated. The duration timer terminates the timing of the duration of the data packets at the time at which the timing finishes.

Step 509 is that: the controller monitors whether user state information and/or current charging counting information meet(s) a set triggering condition, and when the user state information and/or current charging counting information are/is detected to meet the triggering condition, the controller sends an OFPT_MULTIPART_Request message requesting the UGW to report a statistical result.

Here, there is not strict sequence between steps 508 and 509, which may be performed simultaneously.

Step 510 is that: the UGW reports the duration of transmission of the data packets counted by the duration timer to the controller in an OFPT_MULTIPART_Reply message upon reception of the OFPT_MULTIPART_Request message.

Step 511 is that: the controller acquires duration of the service flow and usage of the credit quota based on the statistical result reported from the UGW.

The first preferred implementation of the charging method on duration is further described below with reference to FIG. 6.

Step 607 is that: the controller sends a flow table to the UGW via an OFPT_FLOW_MOD message, sets a timer entry, a duration timer entry and a watchdog timer entry for the flow table, and sets an entry for operation instruction directed to the UGW for instructing the UGW to take time at which the data packets arrive at the flow table as a start time at which the duration timer is initiated, and to initiate the watchdog timer upon complete reception of the data packets.

Step 608 is that: the UGW takes the time at which the data packets arrive at the flow table as the start time at which the timing starts, initiates the duration timer, and initiates the watchdog timer upon complete reception of the data packets; the watchdog timer monitors the arrival of a time at which the duration timer finishes timing.

Here, if there is data transmission in the flow table before expiration of timing time of the watchdog timer, then the duration timer continues timing; if there is no data transmission after the expiration of the timing time of the watchdog timer, then the time at which the timing time expires is taken as the time at which the timing is terminated. The duration timer terminates the timing of the duration of the data packets at the time at which the timing finishes.

Step 609 is that: the UGW monitors the timer and goes to step 610 when the timer expires.

Step 610 is that: the UGW reports the duration of transmission of the data packets counted by the duration timer to the controller in an OFPT_MULTIPART_Reply message.

Step 611 is that: the controller may require duration of the service flow and usage of the credit quota based on the statistical result reported from the UGW.

The third preferred implementation of the charging method on duration is further described below with reference to FIG. 7.

Step 707 is that: the controller sends the flow table to the UGW via an OFPT_FLOW_MOD message, and sets a watchdog timer entry and an entry for operation instruction directed to the UGW for the UGW.

Here, the setting of the entry for operation instruction directed to the UGW may be instructing the UGW to report a start time at which the transmission of the data packets starts and to report a finish time at which the transmission of the data packets is terminated.

Step 708 is that: the UGW takes the time at which the data packets arrive at the flow table as the start time at which the transmission starts, and initiates the watchdog timer upon complete reception of the data packets; the watchdog timer monitors the arrival of a time at which the transmission of the data packets.

Here, if there is still data transmission in the flow table before expiration of timing time of the watchdog timer, then the watchdog timer continues monitoring the arrival of the finish time; if there is no data transmission after the expiration of the timing time of the watchdog timer, then the time at which the timing time expires is taken as the finish time where the transmission of the data packets finishes.

Step 710 is that: the UGW reports the start time and the termination time of the transmission of each data packet to the controller via an OFPT_FLOW_Report message.

Step 711 is that: the controller requires duration of the service flow and usage of the credit quota based on the statistical result reported from the UGW.

For the first, second and third preferred implementations of the charging method on duration described above, there are different charging modes including charging on duration based on a carrier, charging on duration based on a service flow and charging on duration based on a user in the EPS network, therefore, in practical applications, for the charging on duration based on a carrier, the controller may set, for the flow table or its entry matched with TEID, a duration timer, a watchdog timer and instruct the UGW to take the time at which the data packet arrives as a time at which timing starts and to initiate the watchdog timer upon complete reception of the data packet, or set a timer, a duration timer, a watchdog timer and instruct the UGW to take the time at which the data packet arrives as a time at which timing starts and to initiate the watchdog timer upon complete reception of the data packet, or set a watchdog timer and instructing the UGW to report the start time at which the transmission of the data packet begins, and to report the finish time at which the transmission of the data packet finishes.

for the charging on duration based on service traffic flow, the controller may set, for the table or its entry matched with each service flow quintuple, a duration timer, a watchdog timer and instruct the UGW to take the time at which the data packet arrives as a time at which timing starts and to initiate the watchdog timer upon complete reception of the data packet, or set a timer, a duration timer, a watchdog timer and instruct the UGW to take the time at which the data packet arrives as a time at which timing starts and to initiate the watchdog timer upon complete reception of the data packet, or set a watchdog timer and instruct the UGW to report the start time at which the transmission of the data packet begins, and to report the finish time at which the transmission of the data packet finishes.

for the charging on duration based on user, the controller may set, for the table or its entry matched with IP address of the user, a duration timer, a watchdog timer and instruct the UGW to take the time at which the data packet arrives as a time at which timing starts and to initiate the watchdog timer upon complete reception of the data packet, or set a timer, a duration timer, a watchdog timer and instruct the UGW to take the time at which the data packet arrives as a time at which timing starts and to initiate the watchdog timer upon complete reception of the data packet, or set a watchdog timer and instruct the UGW to report the start time at which the transmission of the data packet begins, and to report the finish time at which the transmission of the data packet finishes.

Amongst previous steps 200 to 219, steps 207 to 211 may be equivalently substituted by steps 507 to 511 in the first preferred implementation of the charging method on duration, or by steps 607, 608, 610 and 611 in the second preferred implementation of the charging method on duration, or by steps 707, 708, 710 and 711 in the third preferred implementation of the charging method on duration. Accordingly, in step 212, when the controller acknowledges that the credit quota is not exhausted, it returns to step 509 or 608 or 708. In step 216, the controller monitors usage of the new credit quota in the way as described in steps 509 to 212, or steps 608 to 212, or steps 708 to 212 upon reception of the new credit quota.

Figure 8:
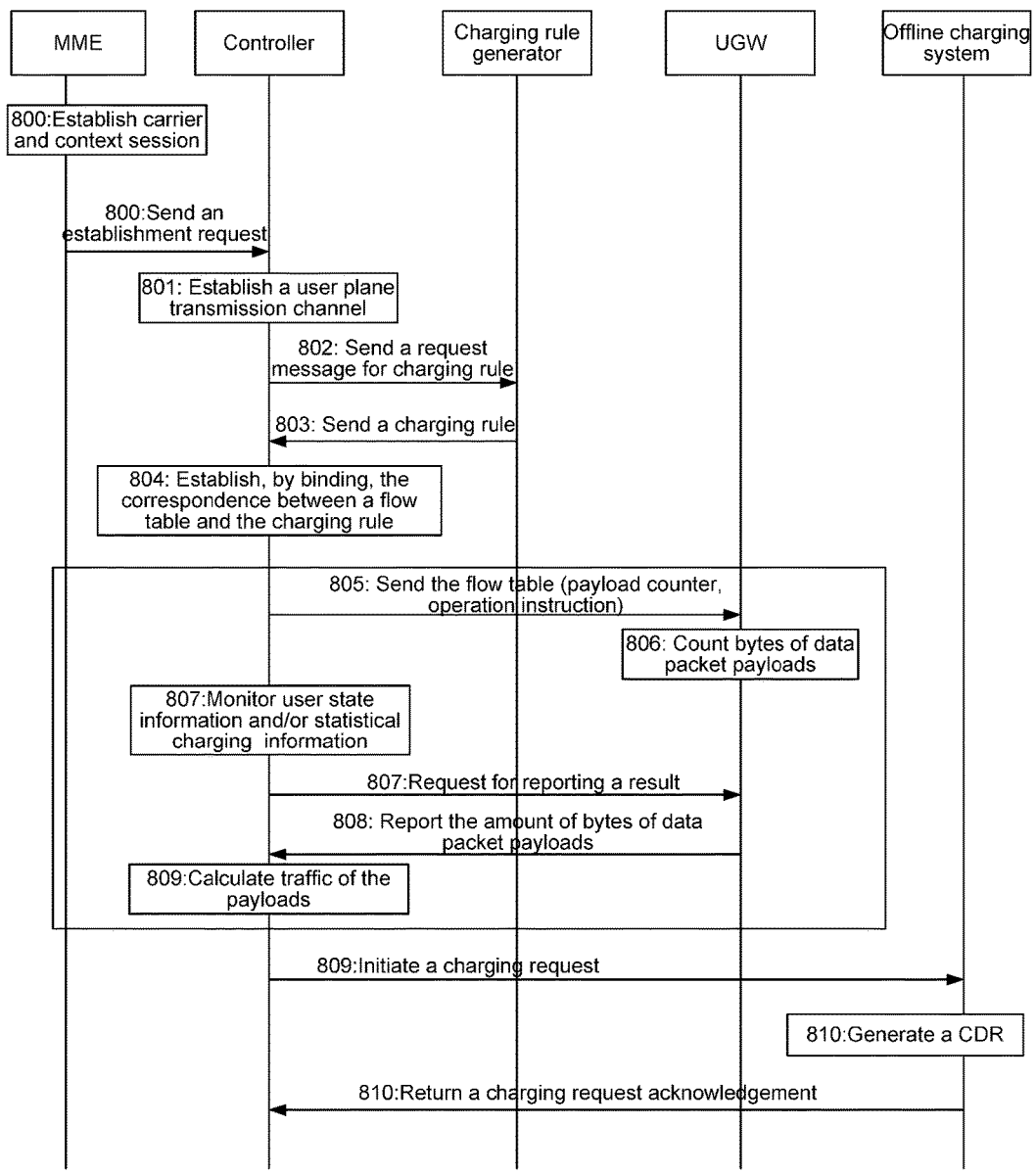
FIG. 8 shows a diagram of another specific embodiment of the charging method based on SDN EPC network according to the present disclosure.

FIG. 8 shows a diagram of another specific embodiment of the charging method based on SDN EPC network according to the present disclosure. The technical scheme of this embodiment of the present disclosure will be further described in combination with FIG. 8. The communication entities to which this embodiment refers includes: a controller, a UGW, an MME, charging rule generator and an OFCS.

Step 800 is that: the MME establishes a service carrier and a context session, and sends a request message for establishment a user plane transmission channel to a controller.

In this case, the request message further carries charging features and user access information of users.

Step 801 is that: the controller establishes a user plane transmission channel upon reception of the request message, to provide a channel for the transmission of user service data.

Here, steps 800 to 810 both involve a unified entity, i.e. a UGW, which is not embodied as a SGW and a PGW. When the UGW is embodied as a SGW and a PGW, and when the controller establishes a user plane transmission channel in step 801, the controller also assigns a charging identifier to each user, through which statistical information reported from the SGW and from the PGW to the controller is bound to the corresponding user.

Step 802 is that: the controller sends a request message for a charging rule to the charging rule generator.

Step 803 is that: the charging rule generator sends a charging rule to the controller upon reception of the request for a charging rule.

Step 804 is that: the controller generates a flow table according to a charging level, a charging mode and a PCC in the charging rule, and establishes, by binding, a correspondence between the flow table and the charging rule.

It should be noted that following steps 805 to 808 describe a first preferred implementation of the charging method.

Step 805 is that: the controller sends a flow table to the UGW via an OFPT_FLOW_MOD message, a payload counter entry and an entry for operation instruction directed to the UGW for instructing the UGW to count bytes of data packet payloads are set in the flow table.

Step 806 is that: the UGW counts bytes of the data packet payloads using the payload counter.

Step 807 is that: the controller monitors whether user state information and/or current charging counting information meets a set triggering condition, and when the user state information and/or current charging counting information are/is detected to meet the triggering condition, the controller sends an OFPT_MULTIPART_Request message requesting the UGW to report a statistical result.

Here, there is not strict sequence between steps 806 and 807, which may be performed simultaneously.

Step 808 is that: the UGW reports the amount of bytes of the payloads counted by the payload counter to the controller in an OFPT_MULTIPART_Reply message upon reception of the OFPT_MULTIPART_Request message.

Step 809 is that: the controller calculates traffic of the data packet payloads upon reception of the statistical result reported from the UGW, and sends a charging request to the OFCS.

Step 810 is that: OFCS generates a Charging Data Record (CDR) upon reception of the charging request, and returns a charging request acknowledgement to the controller.

Here, the controller sends the charging request to the OFCS, which then generates the CDR for the corresponding user, so as to clear charges for the communication of the user.

In the above technical scheme, steps 805 to 808 describe the first preferred implementation of the charging method on traffic. Besides, steps 805 to 808 may be equivalently substituted by any of the follows: the second preferred implementation of the charging method based on traffic as shown in FIG. 3, the third preferred implementation of the charging method based on traffic as shown in FIG. 4, the first preferred implementation of the charging method based on duration as shown in FIG. 5, the second preferred implementation of the charging method based on duration as shown in FIG. 6 and the third preferred implementation of the charging method based on traffic as shown in FIG. 7, which will not be repeated.

While, in the case of the first, second and third preferred implementations of the charging method based on duration, in step 809, the controller calculates the duration of usage of the data packet according to the statistical result reported from the UGW, and sends a charging request to the OFCS.

An embodiment of the present disclosure also provides a computer storage media, in which computer-executable instructions are stored, for implementing the charging method based on a SDN EPC network as described above.

Figure 9:
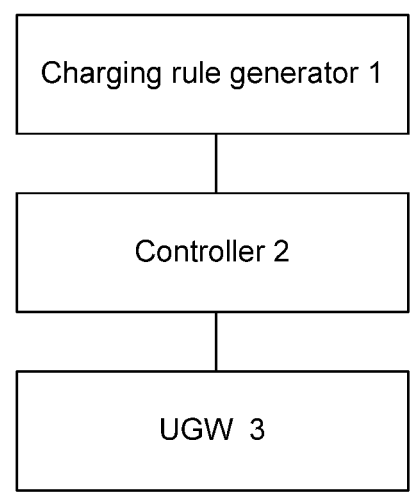
FIG. 9 shows a diagram of the structural composition the charging system based on SDN EPC network according to an embodiment of the present disclosure.

Based on the above implementation, an embodiment of the present disclosure also provides a charging system based on a SDN EPC network, as shown in FIG. 9. The system includes a charge rule generator 1, a controller 2 and a UGW 3, wherein the charging rule generator 1 is configured to generate a charging rule for a user service, and send the charging rule to the controller;

wherein the controller 2 is configured to establish through binding a correspondence between a flow table of the controller and the charging rule according to the charging rule, set entries for the flow table bound to the charging rule, and send the set flow table to the UGW 3;

the UGW 3 is configured to statistically analyse the traffic and/or duration consumed by service data according to the received flow table and its charging mode, and reports a statistical result to the controller 2;

the controller 2 is configured to charge for the service according to the statistical result reported from the UGW 3 and the charging rule bound to the flow table.

In this case, the charging rule includes a charging mode and a charging level, which contain contents described with reference to the previous method.

The system of the embodiment of the present disclosure includes components which are further described in scenarios 1 to 6.

Scenario 1

When a charging mode in the charging rule sent from the charging rule generator 1 to the controller 2 is charging on traffic, the controller 2 sets a payload counter for a flow table and sets an entry for operation instruction for UGW for instructing the UGW 3 to count the data packet payloads, and sends the flow table to the UGW 3; the UGW 3 receives the flow table and counts the data packet payloads using the payload counter; and the controller 2 monitors whether user state information and/or current statistical charging information meets a set triggering condition;

and the controller 2 sends an OFPT_MULTIPART_Request message for requesting the UGW to report the statistical result to the UGW 3 when the user state information and/or current statistical charging information is detected to meet a set triggering condition; when the UGW 3 receives the OFPT_MULTIPART_Request message, returns an OFPT_MULTIPART_Request message to the controller 2, ensuring that the statistical result of the data packet payloads is reported to the controller 3; the controller 3 calculates usage of traffic of the service data based on the statistical result.

Scenario 2

When a charging mode in the charging rule sent from the charging rule generator 1 to the controller 2 is charging on traffic, the controller 2 sets an entry for operation instruction for UGW for instructing the UGW 3 to initiate a timer of the UGW 3 to count the data packets in the service flow, and sends the flow table to the UGW 3; the UGW 3 receives the flow table and counts the data packets in the service steam using the counter of the UGW 3; and when the controller 2 monitors that user state information and/or current statistical charging information meets a set triggering condition, the controller 2 sends an OFPT_MULTIPART_Request message for requesting the UGW 3 to report the statistical result; the UGW 3 returns an OFPT_MULTIPART_Request to the controller 2 upon reception of the OFPT_MULTIPART_Request message and reports the resulted amount of the data packets to the controller 2; the controller 2 calculates usage of traffic of the service data based on the statistical result.

Scenario 3

When a charging mode in the charging rule sent from the charging rule generator 1 to the controller 2 is charging on traffic, the controller 2 sets a timer entry or a traffic threshold entry, and sets an entry for operation instruction for UGW for instructing the UGW 3 to initiate a payload timer to count the data packet payloads or instructing the UGW 3 to initiate the counter of the UGW 3 to count the data packets, and sends the flow table to the UGW 3; the UGW 3 receives the flow table, initiates the timer, and initiates the payload counter to count the data packet payloads or initiates the timer of the UGW 3 to count the data packets; and the UGW 3 monitors whether user state information and/or current statistical charging information meets a set triggering condition, when the user state information and/or current statistical charging information is monitored to meet a set triggering condition, the UGW 3 sends the amount of the data packet payloads or of the data packets to the controller 2 via an OFPT_MULTIPART_Reply message; the controller 2 calculates usage of traffic of the service data based on the statistical result reported from the UGW.

Scenario 4

When a charging mode in the charging rule sent from the charging rule generator 1 to the controller 2 is charging on duration, the controller 2 sets a duration timer entry and a watchdog timer entry for the flow table, and sets an entry for operation instruction for UGW for instructing the UGW 3 to take a time at which the data packets arrive at the flow table as a start time at which the duration timer is initiated, and to initiate the watchdog timer upon complete reception of the data packets; and send the flow table to the UGW 3;

the UGW 3 is configured to receive the flow table, take the time at which the data packets arrive at the flow table as the start time at which the duration timer is initiated, initiate the duration timer, and initiate the watchdog timer upon complete reception of the data packets; the duration timer finishing timing when the watchdog timer monitors the arrival of a time at which the duration timer finishes timing;

Here, if there is data transmission in the flow table before expiration of timing time of the watchdog timer, then the duration timer continues timing; if there is no data transmission after the expiration of the timing time of the watchdog timer, then the time at which the timing time expires is taken as the time at which the timing is terminated. The duration timer terminates the timing of the duration of the data packets at the time at which the timing is terminated.

When the controller 2 detects that user state information and/or current charging counting information meets a set triggering condition, the controller 2 sends an OFPT_MULTIPART_Request message for requesting the UGW 3; the UGW 3 receives said message and reports duration of transmission of the data packets, calculated by the duration timer, to the controller 2; the controller 2 calculates duration of use of the service data based on the statistical result reported from the UGW.

Scenario 5

When a charging mode in the charging rule sent from the charging rule generator 1 to the controller 2 is charging on duration, the controller 2 sets a timer entry, a duration timer entry and a watchdog timer entry for the flow table, and sets an entry for operation instruction for UGW for instructing the UGW 3 to take time at which the data packets arrive at the flow table as a start time at which the duration timer is initiated, and to initiate the watchdog timer upon complete reception of the data packets; and send the flow table to the UGW 3;

the UGW receives the flow table, takes the time at which the data packets arrive at the flow table as the start time at which the duration timer is initiated, and initiates the watchdog timer upon complete reception of the data packets; triggers the duration timer to finish timing when the watchdog timer monitors the arrival of the time at which the duration timer finishes timing; the UGW monitors the timer, and the UGW 3 reports the duration of data transmission, calculated by the duration timer, to the controller 2 in an OFPT_FLOW_Report message when the timer expires; the controller 2 calculates duration of use of the service data based on the statistical result reported from the UGW 3.

In this case, if there is data transmission in the flow table before expiration of timing time of the watchdog timer, then the duration timer continues timing; if there is no data transmission after the expiration of the timing time of the watchdog timer, then the time at which the timing time expires is taken as the time at which the timing is terminated. The duration timer terminates the timing of the duration of the data packets at the time at which the timing finishes.

Scenario 6

When a charging mode in the charging rule sent from the charging rule generator 1 to the controller 2 is charging on duration, the controller 2 sets a watchdog timer entry for the flow table, and sets an entry for operation instruction for UGW for instructing the UGW 3 to report the time at which the data transmission starts and the time at which the data transmission finishes; and sends the flow table to the UGW 3;

the UGW 3 receives the flow table, takes the time at which the data packets arrive at the flow table as the start time of the transmission, and initiating the watchdog timer upon complete reception of the data packets; the watchdog timer monitors an arrival of the termination time at which the transmission of the data packets finishes, and reports the start time and the termination time of the transmission of the data packets to the controller 2; the controller calculates duration of use of the service data based on the statistical result reported from the UGW.

In the above scenarios, the referred user state information includes, but is not limited to, a user location, an access network type, a used rate period and quality of service;

the statistical charging information includes, but is not limited to user's credit quota, traffic, amount of data packets, amount of data packet payloads, duration of transmission of data packets, start time of the transmission of data packets, termination time of the transmission of data packets.

Those skilled in the art should understand that the achieved functions of processing modules in the charging system based on a SDN EPC network as shown in FIG. 9 may be understood by reference to the description related to the charging method based on a SDN EPC network. Those skilled in the art should understand that the functions of processing modules in the charging system based on a SDN EPC network as shown in FIG. 9 may be implemented by a programme running on a processor or by a specific logic circuit.

The present disclose provides a charging method and system based on a SDN EPC network and a computer storage media, in which a controller receives a charging rule from a charging rule generator, and establishes, through binding, a correspondence between a flow table of the controller and the charging rule; the controller sets entries for the flow table bound to the charging rule, and sends the set flow table to a UGW; the UGW statistically analyses the traffic and/or duration consumed by service data according to the received flow table and its charging mode, and reports a statistical result to the controller; and the controller receives the statistical result, reported from the UGW, regarding traffic or duration consumed by a service in the flow table, and charges for the service according to the statistical result and the charging rule bound to the flow table. The technical scheme according to the embodiments of the present disclosure enables the implementation of charging for communication services either in SDN networks or in EPC networks with good universality and enhanced portability, adapted to the development requirements for the new generation mobile communication.

Those skilled in the art should understand that the embodiments of the present disclosure may be a method, a system or a computer programme product. Therefore, the present disclosure may take the form of a hardware embodiment, a software embodiment, or an embodiment combining hardware and software. Moreover, the present disclosure may take the form of a computer programme product which is embodied on one or more computer-usable storage media (including but not limited to disk storage, optical storage and so forth) containing computer-usable programme codes.

The present disclosure is described by reference to flowcharts and/or block diagrams the method, device (system) and computer programme product of the embodiments of the present disclosure. It should be understood that each of the processes and/or blocks and combination thereof are implemented by computer programme instructions. These computer programme instructions may be provided for a processor of a universal computer, a dedicated computer, en embedded processor or other programmable data processing devices to form a machine, instructions executed by a processor of a computer or other programmable data processing devices therefore form an apparatus for implementing functions indicated in one or more processes in a flowchart and/or one or more blocks in a block diagram.

There computer programme instructions may also be stored in a computer-readable storage which enables a computer or other programme data processing devices to operate in a particular way, such that the instructions stored in the computer-readable storage form a manufacture including an instruction apparatus, which implements the functions indicated in one or more processes in a flowchart and/or one or more blocks in a block diagram.

These computer programme instructions may be loaded into a computer or other programmable data processing devices, such that the computer or other programmable data processing devices perform a series of operation steps to implement processing realized by the computer, therefore the instructions executed on the computer or other programmable devices are used for implementing steps of functions indicated in one or more processes in a flowchart and/or one or more blocks in a block diagram.

Above description are merely preferred embodiments of the present disclosure, but not to limit the scope of protection of the present disclosure.

The invention claimed is:

1. A charging method based on a software defined network evolved packet core (SDN EPC) network, comprising:
    receiving, by a controller, a charging rule from a charging rule generator, and establishing, through binding, a correspondence between a flow table of the controller and the charging rule;
    setting, by the controller, entries for the flow table bound to the charging rule, and sending the flow table to a unified gateway (UGW); and
    receiving, by the controller, from the UGW a statistical result regarding traffic and/or duration consumed by a service in the flow table, and charging for the service according to the statistical result and the charging rule bound to the flow table;
    wherein the entries for the flow table at least comprise a payload counter, a timer, a traffic threshold, a duration timer, a watchdog timer and an operation instruction directed to the UGW.

2. The charging method based on a SDN EPC network according to claim 1, further comprising: after the controller sends the flow table to the UGW,
    statistically analysing, by the UGW, the traffic and/or duration consumed by service data according to the flow table and a charging mode associated with the flow table, and reporting the statistical result to the controller;
    wherein the charging rule comprises the charging mode.

3. The charging method based on a SDN EPC network according to claim 2, wherein the charging mode comprises: charging on traffic and/or charging on duration.

4. The charging method based on a SDN EPC network according to claim 3, wherein for the charging mode which is charging on traffic,
    the flow table sent from the controller to the UGW is set with the payload counter and the operation instruction for instructing the UGW to count data packet payloads;
    the UGW counts the data packet payloads using the payload counter;
    when user state information and/or current statistical charging information are/is detected by the controller to meet a set triggering condition, the controller sends a message for requesting the UGW to report the statistical result to the UGW, the UGW receives the message and reports the amount of the counted data packet payloads to the controller; and
    the controller calculates traffic usage of the service data based on the statistical result.

5. The charging method based on a SDN EPC network according to claim 3, wherein for the charging mode which is charging on traffic,
    the flow table sent from the controller to the UGW is set with the operation instruction for instructing the UGW to initiate a counter of the UGW for counting service data packets;
    the UGW counts data packets in a service flow using the counter of the UGW;
    when user state information and/or current statistical charging information are/is detected by the controller to meet a set triggering condition, the controller sends a message for requesting the UGW to report the statistical result to the UGW, the UGW receives the message and reports the amount of the counted data packets to the controller;
    the controller calculates traffic usage of the service data based on the statistical result.

6. The charging method based on a SDN EPC network according to claim 3, wherein for the charging mode which is charging on traffic,
    the flow table sent from the controller to the UGW is set with the timer or the traffic threshold, and with the operation instruction for instructing the UGW to initiate the payload counter which is set in the flow table to count data packet payloads, or instructing the UGW to initiate a counter of the UGW to count data packets;
    the UGW initiates the timer, and initiates the payload counter to count data packet payloads, or initiates the counter of the UGW to count data packets;
    the UGW reports the amount of the counted data packet payloads or the amount of the counted data packets to the controller upon detection of an expiration of the timer or reaching of the traffic threshold;
    the controller calculates traffic usage of the service data based on the statistical result reported from the UGW.

7. The charging method based on a SDN EPC network according to claim 3, wherein for the charging mode which is charging on duration,
    the flow table sent from the controller to the UGW is set with the duration timer, the watchdog timer, and set with the operation instruction for instructing the UGW to take a time at which data packets arrive at the flow table as a start time at which the duration timer is initiated, and to initiate the watchdog timer upon complete reception of the data packets;
    the UGW takes the time at which the data packets arrive at the flow table as the start time at which the duration timer is initiated, initiates the duration timer, and initiates the watchdog timer upon complete reception of the data packets; the duration timer terminates timing when the watchdog timer detects arrival of a time at which the duration timer terminates timing;
    when the controller detects user state information and/or current statistical charging information meet a set triggering condition, the controller sends a message for requesting the UGW to report the statistical result, and the UGW receives the message and reports duration of transmission of the data packets, calculated by the duration timer, to the controller;
    the controller calculates duration of use of the service data based on the statistical result reported from the UGW.

8. The charging method based on a SDN EPC network according to claim 7, further comprising:
    the duration timer continues timing in a situation that there is still data transmission in the flow table before expiration of timing time of the watchdog timer; the duration timer takes the time at which the timing time expires as the time at which the duration timer terminates timing in a situation that there is no data transmission after the expiration of the timing time of the watchdog timer; or
    the watchdog timer continues monitoring the arrival of the termination time at which the transmission of the data packets is terminated in a situation that there is still data transmission in the flow table before expiration of timing time of the watchdog timer; the watchdog timer takes the time at which the timing time expires as the termination time when the transmission of the data packets is terminated in a situation that there is no data transmission after the expiration of the timing time of the watchdog timer.

9. The charging method based on a SDN EPC network according to claim 3, wherein for the charging mode which is charging on duration, the flow table sent from the controller to the UGW is set with the timer, the duration timer and the watchdog timer, and set with the operation instruction for instructing the UGW to take a time at which data packets arrive at the flow table as a start time at which the duration timer is initiated, and to initiate the watchdog timer upon complete reception of the data packets;

the UGW takes the time at which the data packets arrive at the flow table as the start time at which the duration timer is initiated, and initiates the watchdog timer upon complete reception of the data packets; the watchdog timer triggers the duration timer to terminate timing when the watchdog timer detects arrival of a time at which the duration timer terminates timing; the UGW monitors the timer, and reports duration of transmission of the data packets, calculated by the duration timer, to the controller when the timer expires;

the controller calculates duration of use of the service data based on the statistical result reported from the UGW.

10. The charging method based on a SDN EPC network according to claim 3, wherein for the charging mode which is charging on duration, the flow table sent from the controller to the UGW is set with the watchdog timer, and set with the operation instruction for instructing the UGW to report a start time at which transmission of data packets starts, and to report a termination time at which the transmission of the data packets is terminated;

the UGW takes the time at which the data packets arrive at the flow table as the start time of the transmission, and initiates the watchdog timer upon complete reception of the data packets; the watchdog timer detects an arrival of the termination time at which the transmission of the data packets is terminated, and reports the start time and the termination time of the transmission of the data packets to the controller; the controller calculates duration of use of the service data based on the statistical result reported from the UGW.

11. A charging system based on a software defined network evolved packet core (SDN EPC) network, comprising a charge rule generator, a controller and a unified gateway (UGW), wherein the charging rule generator is configured to generate a charging rule for a user service, and sending the charging rule to the controller;

the controller is configured to establish through binding a correspondence between a flow table of the controller and the charging rule according to the charging rule, set entries for the flow table bound to the charging rule, and send the flow table to the UGW;

the UGW is configured to statistically analyse traffic and/or duration consumed by service data according to the flow table and a charging mode associated with the flow table, and report a statistical result to the controller; and the controller is configured to charge for the user service according to the statistical result and the charging rule bound to the flow table;

wherein the charging rule comprises the charging mode;

wherein the entries for the flow table at least comprise a payload counter, a timer, a traffic threshold, a duration timer, a watchdog timer and an operation instruction directed to the UGW.

12. The charging system based on a SDN EPC network according to claim 11, wherein the charging mode comprises: charging on traffic and/or charging on duration.

13. The charging system based on a SDN EPC network according to claim 12, wherein when the charging mode is the charging on traffic, the controller is configured to set the payload counter for the flow table, set the operation instruction for instructing the UGW to count data packet payloads, and send the flow table to the UGW;

the UGW is correspondingly configured to receive the flow table and use the payload counter to count the data packet payloads;

the controller is configured to send a message for requesting the UGW to report the statistical result to the UGW when user state information and/or current statistical charging information are/is detected to meet a set triggering condition;

the UGW is configured to report the amount of the counted data packet payloads to the controller upon reception of the message; and the controller is configured to calculate traffic usage of the service data based on the statistical result.

14. The charging system based on a SDN EPC network according to claim 12, wherein when the charging mode is the charging on traffic, the controller is configured to set the operation instruction for the flow table for instructing the UGW to initiate a counter of the UGW for counting service data packets, and send the flow table to the UGW;

the UGW is correspondingly configured to receive the flow table and count data packets in a service flow using the counter of the UGW; the controller is configured to send a message for requesting the UGW to report the statistical result when user state information and/or current statistical charging information are/is detected to meet a set triggering condition;

the UGW is configured to report the amount of the counted data packets to the controller upon reception of the message; and the controller is configured to calculate traffic usage of the service data based on the statistical result.

15. The charging system based on a SDN EPC network according to claim 12, wherein when the charging mode is the charging on traffic, the controller is configured to set the timer or the traffic threshold for the flow table, and set the operation instruction for instructing the UGW to initiate the payload counter which is set in the flow table to count data packet payloads, or instructing the UGW to initiate a counter of the UGW to count data packets; and send the flow table to the UGW;

the UGW is correspondingly configured to receive the flow table, initiate the timer, and initiate the payload counter to count data packet payloads, or initiating the counter of the UGW to count data packets; report the amount of the counted data packet payloads or the amount of the counted data packets to the controller upon detection of an expiration of the timer or reaching of the traffic threshold; and the controller is configured to calculate traffic usage of the service data based on the statistical result reported from the UGW.

16. The charging system based on a SDN EPC network according to claim 12, wherein when the charging mode is the charging on duration, the controller is configured to set the duration timer and the watchdog timer for the flow table, and set the operation instruction for instructing the UGW to take a time at which data packets arrive at the flow table as a start time at which the duration timer is initiated, and to initiate the watchdog timer upon complete reception of the data packets, and to send the flow table to the UGW;

the UGW is configured to receive the flow table, take the time at which the data packets arrive at the flow table as the start time at which the duration timer is initiated, initiate the duration timer, and initiate the watchdog timer upon complete reception of the data packets; wherein the duration timer terminates timing when the watchdog timer detects arrival of a time at which the duration timer terminates timing;

the controller is configured to send a message for requesting the UGW to report the statistical result when user state information and/or current statistical charging information are/is detected to meet a set triggering condition;

the UGW is configured to report duration of transmission of the data packets, which is calculated by the duration timer, to the controller upon reception of the message; and the controller is configured to calculate duration of use of the service data based on the statistical result reported from the UGW.

17. The charging system based on a SDN EPC network according to claim 12, wherein when the charging mode is the charging on duration, the controller is configured to set the timer, the duration timer and the watchdog timer for the flow table, and set the operation instruction for instructing the UGW to take a time at which data packets arrive at the flow table as a start time at which the duration timer is initiated, and to initiate the watchdog timer upon complete reception of the data packets; and send the flow table to the UGW;

the UGW is correspondingly configured to receive the flow table, take the time at which the data packets arrive at the flow table as the start time at which the duration timer is initiated, and initiate the watchdog timer upon complete reception of the data packets; the watchdog timer is configured to trigger the duration timer to terminate timing when the watchdog timer detects arrival of a time at which the duration timer terminates timing; the UGW is configured to monitor the timer and report duration of transmission of the data packets, calculated by the duration timer, to the controller when the timer expires; and the controller is configured to calculate duration of use of the service data based on the statistical result reported from the UGW.

18. The charging system based on a SDN EPC network according to claim 12, wherein when the charging mode is the charging on duration, the controller is configured to set the watchdog timer for the flow table, and setting the operation instruction for instructing the UGW to report a start time at which transmission of data packets starts, and to report a termination time at which the transmission of the data packets is terminated, and to send the flow table to the UGW;

the UGW is correspondingly configured to receive the flow table, take the time at which the data packets arrive at the flow table as the start time of the transmission, and initiate the watchdog timer upon complete reception of the data packets; the watchdog timer detects an arrival of the termination time at which the transmission of the data packets is terminated, and reports the start time and the termination time of the transmission of the data packets to the controller; and the controller is configured to calculate duration of use of the service data based on the statistical result reported from the UGW.

19. A non-transitory computer storage media, in which computer-executable instructions are stored for implementing a charging method based on a software defined network evolved packet core (SDN EPC) network which comprises steps of:

receiving, by a controller, a charging rule from a charging rule generator, and establishing, through binding, a correspondence between a flow table of the controller and the charging rule;

setting, by the controller, entries for the flow table bound to the charging rule, and sending the flow table to a unified gateway (UGW); and receiving, by the controller, from the UGW a statistical result regarding traffic and/or duration consumed by a service in the flow table, and charging for the service according to the statistical result and the charging rule bound to the flow table;

wherein the entries for the flow table at least comprise a payload counter, a timer, a traffic threshold, a duration timer, a watchdog timer and an operation instruction directed to the UGW.

20. The charging system based on a SDN EPC network according to claim 16, wherein the watchdog timer is configured to:

when there is still data transmission in the flow table before expiration of timing time of the watchdog timer, notify the duration timer to continue timing; when there is no data transmission after the expiration of the timing time, notify the duration timer to take the time at which the timing time expires as the time at which the duration timer terminates timing; or when there is still data transmission in the flow table before expiration of timing time of the watchdog timer, continue monitoring the arrival of a termination time at which the transmission of the data packets is terminated; when there is no data transmission after the expiration of the timing time of the watchdog timer, take the time at which the timing time expires as the termination time where the transmission of the data packets is terminated.

\* \* \* \* \*